L. F. PARKHURST & H. G. WEEKS.
SAD IRON.
APPLICATION FILED OCT. 18, 1909.
969,976.
Patented Sept. 13, 1910.
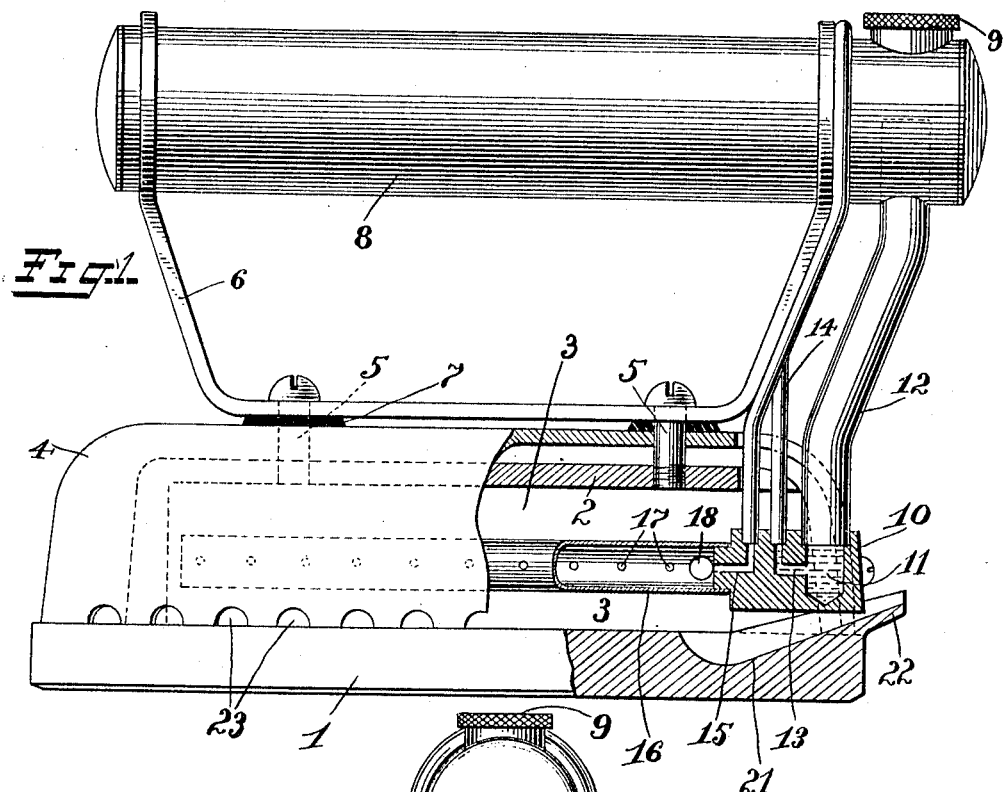
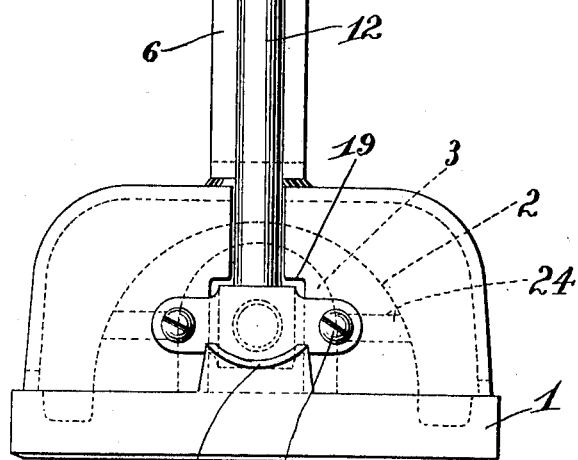
Witnesses:
Fred M. Dannenfelser
Chas. W. Pearl
Inventors
L. F. Parkhurst
H. G. Weeks
By their Attorneys

UNITED STATES PATENT OFFICE.

LEON F. PARKHURST AND HARRY G. WEEKS, OF BINGHAMTON, NEW YORK, ASSIGNORS TO DIAMOND ELECTRIC COMPANY, OF BINGHAMTON, NEW YORK, A CORPORATION OF NEW YORK.

SAD-IRON.

969,976.  Specification of Letters Patent.  Patented Sept. 13, 1910.

Application filed October 18, 1909. Serial No. 523,311.

*To all whom it may concern:*

Be it known that we, LEON F. PARKHURST and HARRY G. WEEKS, citizens of the United States, residing at Binghamton, Broome county, New York, have invented certain new and useful Improvements in Sad-Irons, of which the following is a full, clear, and exact description.

Our invention relates to improvements in sad irons and is particularly concerned with devices of this character which are provided with heating means mounted upon the iron itself.

The object of the invention is to provide a construction of this character which may be readily assembled and disassembled for repair of the parts; to provide a fuel reservoir conveniently located in the handle of the iron and having suitable connections for conducting the fuel fluid to the burner; to so assemble the handle upon the iron as to effectually insulate the handle from the heat of the iron; to provide a combined fuel supply pipe and vaporizing chamber so arranged that when the iron is not in use leakage of the fuel fluid from the reservoir to the burner will be effectually prevented, and finally, to provide a suitable primer for initial heating of the burner to start the operation thereof.

With these objects in view the invention consists in the construction and arrangement of parts a preferred embodiment of which is illustrated in the accompanying drawings, in which, Figure 1 is a side elevation of an iron partly in section embodying our improvements, and Fig. 2 is a rear end view of the iron.

In the embodiment of our invention herein selected for illustration, 1 indicates the base of the iron which has cast integrally therewith a hollow boss or projection 2 forming the heating chamber 3 of the iron by means of which the heat of the burner hereinafter to be described is directly conducted to the base of the iron. By this construction substantially all of the heat is applied directly to the body of the iron instead of being dissipated through connections between the heating chamber and the base.

Inclosing the heating chamber and spaced away therefrom is a cover 4, which is secured to the iron by means of screws 5, which screws also serve to attach the handle bail 6 to the iron. Between the bail 6 and the cover 4 are interposed insulating washers 7. By this construction the bail is effectually insulated from the body of the iron.

On the handle bail 6 is mounted the handle proper 8 which constitutes also a reservoir for holding the fuel supply, such, for example, as alcohol and the like, said reservoir being provided at the end which projects to the rear of the handle bail with the usual screw cap 9 for filling purposes.

The burner proper comprises a burner body 10 having a passage 11 which is connected by means of a supply pipe 12 with the reservoir 8 and by means of a reduced passage 13 with a tube 14 which extends upwardly and over the reservoir 8 and connects with a jet 15 communicating with the burner tube proper 16. The burner tube is provided with the usual jet openings 17 and with an air inlet 18 by which the required quantity of air is admitted to the burner tube and forms the combustible mixture with the fuel vapor.

After the cover 4 and handle bail 6 have been assembled upon the body of the iron, the reservoir 8 may be conveniently slipped into the upper ends of the handle bail and the burner connected therewith simultaneously slipped in through an opening 19 in the rear of the cover 4 into the heating chamber and secured in position by means of screws 20 which serve to hold the burner and the reservoir securely in place. Beneath the burner body 10 the base of the iron is provided with a suitable priming chamber 21 having a lip 22 by which the priming fluid may be introduced for the purpose of initial heating of the burner.

In the operation of the device the fuel fluid passes from the reservoir through the pipe 12 and into that arm of the vaporizing tube 14 which connects with the passage 13 in the burner body 10 wherein it will rise to the level of the fluid in the reservoir. Upon heating the burner from the primer the fluid in the pipe 14 will be vaporized and the vapor communicated to the burner tube 16 through that portion of the vaporizing tube 14 which communicates with the vapor jet passage 15 in the burner body. The flow of vapor from the jet passage 15 into the burner tube draws in a sufficient quantity of air through the air inlet 18 to form the proper combustible compound.

In order to supply the necessary air to the burner tube, the cover plate 4 is provided with openings 23 which communicate with the space between the cover 4 and the burner chamber 2 and the walls of said chamber are provided with air passages 24 communicating with said chamber.

By the construction above described, it will be seen that the heat from the burner is conveyed directly to the body of the iron and by reason of the considerable air space between the burner 2 and the cover 4, the heat will be effectually confined within the iron. Furthermore, by reason of the fact that the vaporizing tube 14 passes upwardly and over the reservoir 8, any possibility of leakage of fuel from the reservoir to the burner will be eliminated.

While we have herein described a preferred embodiment of our invention, it is to be understood that the same may be varied in detail and relative arrangement of parts without departing from the spirit or scope thereof.

What we claim is:

1. A self heating sad iron comprising in combination a flat base, a hollow boss cast integrally with the base of the iron and forming a heating chamber, a hollow cover resting on the base around said boss and forming an air chamber around the same, a handle for said iron mounted on said cover and having a fuel reservoir formed as a part thereof, a burner in said heating chamber and supply connections between said reservoir and said burner.

2. A self heating sad iron having a heating chamber cast integrally therewith, a burner in said heating chamber, a handle, a reservoir forming a part of said handle, a fuel supply pipe for said burner, a vaporizing tube connecting with said supply pipe and extending over said reservoir and connecting with said burner.

3. A self heating sad iron comprising a body portion having a heating chamber, a handle for said iron comprising a handle bail and a fuel reservoir mounted on said handle bail and forming the grip for said handle, a burner in said heating chamber comprising a body portion having a supply passage and a jet passage therein, a burner tube connecting with said jet passage, a supply pipe connecting said reservoir and said supply passage and a vaporizing tube communicating with said supply passage and extending upwardly and over said reservoir and downwardly and connecting with said jet passage.

4. A self heating sad iron comprising a base having a heating chamber thereon, a cover mounted on said base and surrounding said heating chamber, a handle mounted on said cover and comprising a fuel reservoir as a part thereof, a burner body having a burner tube, a supply pipe connecting said reservoir and said burner body, and a vaporizing tube interposed between said supply pipe and said burner tube and extending from said burner body upwardly and over said reservoir and back to said burner body.

5. A self heating sad iron comprising a base having a heating chamber thereon, a cover detachably mounted on said base and surrounding said heating chamber, a handle mounted on said cover, a reservoir forming a part of said handle, a burner mounted in said heating chamber, a supply pipe connecting said reservoir and burner, a vaporizing tube communicating with said supply pipe and said burner and having a portion extending above the level of the fluid in said reservoir and a primer formed in said base and located beneath the junction between said burner and said vaporizing tube.

LEON F. PARKHURST.
HARRY G. WEEKS.

Witnesses:
ISRAEL T. DEYO,
INA E. HILLER.